US011199898B2

United States Patent
Blume et al.

(10) Patent No.: US 11,199,898 B2
(45) Date of Patent: Dec. 14, 2021

(54) GAZE BASED INTERFACE FOR AUGMENTED REALITY ENVIRONMENT

(71) Applicant: SentiAR, Inc., St. Louis, MO (US)

(72) Inventors: Walter Blume, Edwardsville, IL (US); Michael K. Southworth, St. Louis, MO (US); Jennifer N. Avari Silva, St. Louis, MO (US); Jonathan R. Silva, St. Louis, MO (US)

(73) Assignee: SentiAR, Inc., St. Louis, MO (US)

( * ) Notice: Subject to any disclaimer, the term of this patent is extended or adjusted under 35 U.S.C. 154(b) by 0 days.

(21) Appl. No.: 16/453,027

(22) Filed: Jun. 26, 2019

(65) Prior Publication Data
US 2020/0004328 A1     Jan. 2, 2020

Related U.S. Application Data

(60) Provisional application No. 62/690,834, filed on Jun. 27, 2018.

(51) Int. Cl.
    *G06F 3/01*        (2006.01)
    *G06T 19/00*      (2011.01)

(52) U.S. Cl.
    CPC .............. *G06F 3/013* (2013.01); *G06F 3/012* (2013.01); *G06F 3/017* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 9,094,677 | B1 * | 7/2015 | Mendis | G02B 27/0176 |
| 2012/0257035 | A1 | 10/2012 | Larsen | |
| 2013/0128364 | A1 * | 5/2013 | Wheeler | A61B 3/113 |
| | | | | 359/630 |
| 2013/0154913 | A1 | 6/2013 | Gene et al. | |
| 2015/0153571 | A1 * | 6/2015 | Ballard | H04L 12/1822 |
| | | | | 345/8 |
| 2015/0293586 | A1 * | 10/2015 | Kritt | G06T 11/60 |
| | | | | 345/158 |

(Continued)

OTHER PUBLICATIONS

Fujii et al., "Gase Gesture Based Human Robot Interaction For Laparoscopic Surgery", Nov. 2017 (Year: 2017).*

(Continued)

*Primary Examiner* — Hilina K Demeter
(74) *Attorney, Agent, or Firm* — Fenwick & West LLP

(57) ABSTRACT

In an embodiment, a processing system provides an augmented reality object for display by a head-mounted device (HMD) worn by a user. The processing system provides an augmented reality graphic for display by the HMD on a plane and overlaid on the augmented reality object. The processing system determines a gaze direction of the user using sensor data captured by a sensor of the HMD. Responsive to determining that the gaze direction intersects with the augmented reality graphic on the plane and remains intersecting for at least a period of time, the processing system determines a position of intersection between the gaze direction and the augmented reality graphic on the plane. The processing system provides a modified version of the augmented reality object for display by the HMD according to the position of intersection during the period of time.

19 Claims, 11 Drawing Sheets

(56) References Cited

U.S. PATENT DOCUMENTS

| | | | |
|---|---|---|---|
| 2016/0004306 A1 | 1/2016 | Maltz | |
| 2016/0026242 A1* | 1/2016 | Burns | G02B 27/017 |
| | | | 345/633 |
| 2016/0140766 A1 | 5/2016 | Balachandreswaran et al. | |
| 2017/0265943 A1* | 9/2017 | Sela | A61B 34/20 |
| 2017/0270715 A1* | 9/2017 | Lindsay | G06T 7/70 |
| 2017/0295373 A1* | 10/2017 | Zhang | H04N 19/176 |
| 2018/0300952 A1* | 10/2018 | Evans | G06F 3/04845 |
| 2018/0368656 A1* | 12/2018 | Austin | A61B 90/20 |

OTHER PUBLICATIONS

PCT International Search Report and Written Opinion, PCT Application No. PCT/US19/39076, dated Sep. 24, 2019, 15 pages.

* cited by examiner

600

```
┌─────────────────────────────────────────┐
│ Provide AR object for display by a HMD  │
│            worn by a user               │
│                  610                    │
└─────────────────────────────────────────┘
                    │
                    ▼
┌─────────────────────────────────────────┐
│ Provide AR graphic for display on a     │
│ plane and overlaid on the AR object     │
│                  620                    │
└─────────────────────────────────────────┘
                    │
                    ▼
┌─────────────────────────────────────────┐
│    Determine gaze direction of the user │
│                  630                    │
└─────────────────────────────────────────┘
                    │
                    ▼
┌─────────────────────────────────────────┐
│ Determine that the gaze direction       │
│ intersects with the AR graphic on       │
│ the plane                               │
│                  640                    │
└─────────────────────────────────────────┘
                    │
                    ▼
┌─────────────────────────────────────────┐
│      Determine a position of intersection│
│                  650                    │
└─────────────────────────────────────────┘
                    │
                    ▼
┌─────────────────────────────────────────┐
│ Provide a modified version of the AR    │
│ graphic according to the position of    │
│ intersection                            │
│                  660                    │
└─────────────────────────────────────────┘
```

FIG. 6

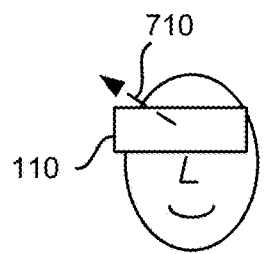
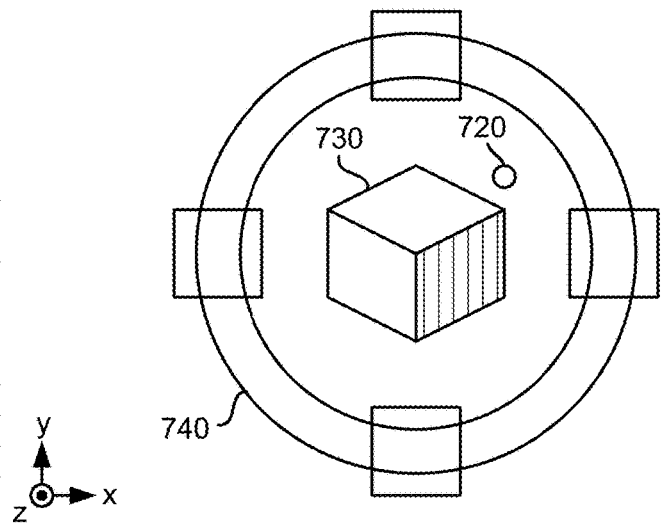
FIG. 7A
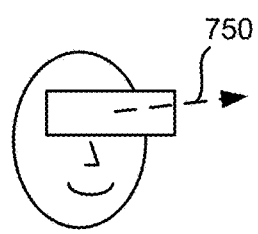
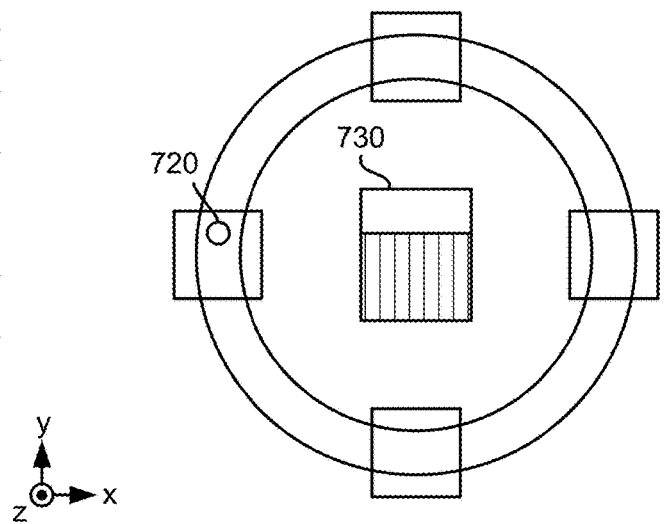
FIG. 7B
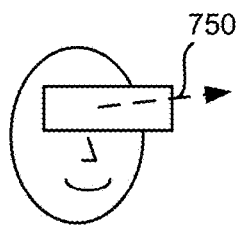
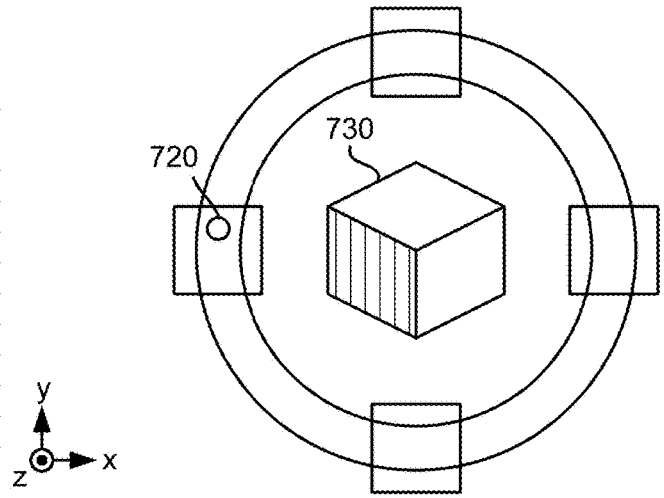
FIG. 7C

GAZE BASED INTERFACE FOR AUGMENTED REALITY ENVIRONMENT

CROSS REFERENCE TO RELATED APPLICATION

This application claims the benefit of priority to U.S. Provisional Application No. 62/690,834, filed on Jun. 27, 2018, which is incorporated herein by reference in its entirety for all purposes.

TECHNICAL FIELD

This disclosure relates to manipulation of displays in a virtual, augmented, or mixed reality environment.

BACKGROUND

In the field of medical interventional and surgical suites, a physician actively uses one or both hands to control various aspects of a procedure. In many cases, the hands are gloved and in a sterile field. Often the physician's hands are occupied manipulating surgical devices. For these reasons, it may be challenging for the physician to control other devices using hand-based interaction. Often, ancillary information such as three-dimensional (3D) imagery is presented to the physician on medical displays. Conventional medical displays may require a mouse, touchpad, or joystick operated by hand to control the viewing orientation and scale of the 3D information presented to the physician. For conventional 2D displays of 3D objects, physicians may normally employ mouse movements to effect control of the orientation of the object. It would be desirable to provide a means to control orientation and scale of displayed objects or information in an intuitive manner that requires less use of the hands.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

FIG. 6 is a flowchart of a process for modifying a display in an augmented reality environment according to an embodiment.

FIGS. 7A, 7B, and 7C illustrate a sequence of example fields of view of a user in an augmented reality environment according to an embodiment.

SUMMARY

Figure 1:
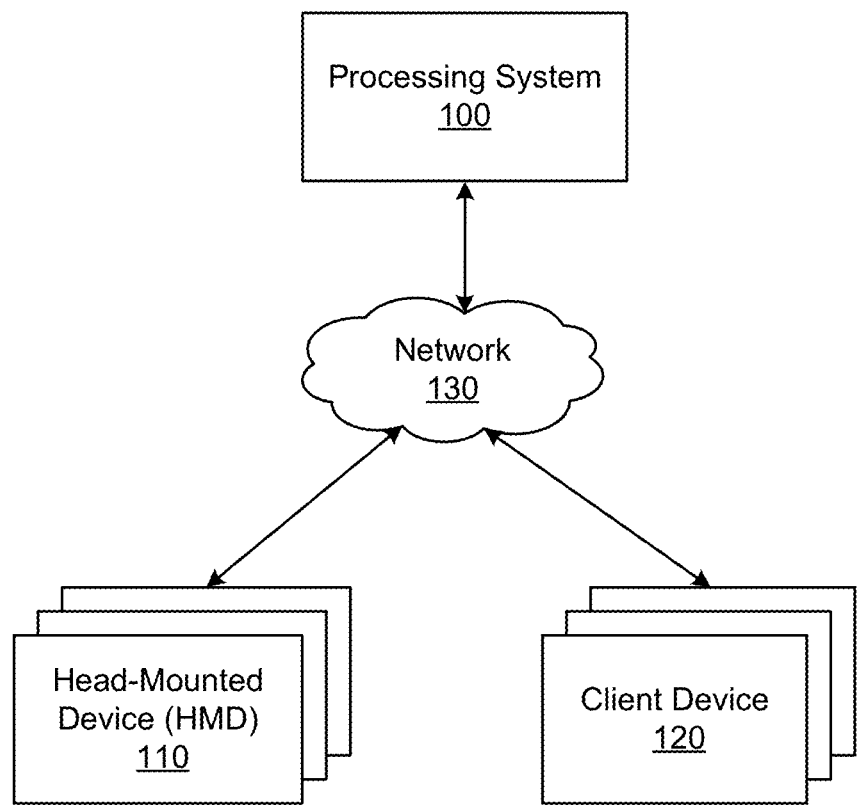
FIG. 1 illustrates an example system environment for a processing system according to an embodiment.

A processing system uses gaze direction or head position to manipulate display of objects in 2D or 3D space. The object may be presented in an artificial reality environment such as virtual reality (VR), augmented reality (AR), or mixed reality (MR). In other embodiments, the object may be presented on a (e.g., 2D) display of a client device such as a computer. The object may be a virtual object, that is, a virtual representation of a real object. As used herein, gaze direction is defined at least by an orientation of the head of a user, which may indicate a direction at which the user is looking. The processing system may determine gaze direction using head position and orientation information based on sensor data captured by a head-mounted device (HMD) worn by the user. The processing system may also use information indicating orientation of the user's pupils in isolation or in combination with head orientation and position to determine gaze direction.

The processing system provides an augmented reality graphic for display to the user, where the augmented reality graphic is overlaid on another displayed object. The processing system enables the user to manipulate the displayed object by interacting with the augmented reality graphic. For example, the augmented reality graphic has an annular shape. Responsive to detecting that the user's gaze is directed at the annular shape, the processing system rotates the displayed object. Since an axis of rotation may be based on a position of intersection between the gaze direction of the user and the annular shape, the processing system can provide perceptual cues for intuitive control of the displayed object's orientation.

In some embodiments, the processing system coordinates or synchronizes manipulation of displayed objects across multiple HMDs worn by different users. Additionally, the processing system may register an augmented reality graphic to a client device. Once registered, the processing system may transmit information to the client device for modifying an object displayed by the client device according to user interactions with the augmented reality graphic. For example, the processing system uses interactions with the augmented reality graphic to emulate mouse-based (or other touch-based) orientation control of an electronic display. Thus, the processing system may be compatible with various computing systems without requiring hardware or software modifications to a source computing system.

In one embodiment, a method includes providing an augmented reality object for display by a head-mounted device (HMD) worn by a user. The method further comprises providing an augmented reality graphic for display by the HMD on a plane and overlaid on the augmented reality object. The method further comprises determining a gaze direction of the user using sensor data captured by a sensor of the HMD. The method further comprises, responsive to determining that the gaze direction intersects with the augmented reality graphic on the plane and remains intersecting for at least a period of time, determining a position of intersection between the gaze direction and the augmented reality graphic on the plane; and providing a modified version of the augmented reality object for display by the HMD according to the position of intersection during the period of time.

In some embodiments, the method further comprises determining an axis of rotation using the position of intersection, where providing the modified version of the augmented reality object for display comprises rotating the augmented reality object about the axis of rotation during the period of time. In some embodiments, the augmented reality graphic has an annulus shape having a center aligned to the augmented reality object, where determining the axis of rotation comprises: determining a vector on the plane between the center and the position of intersection; and determining, as the axis of rotation, an axis orthogonal to the vector on the plane. In some embodiments, the augmented reality graphic has a plurality of sections aligned to a horizontal or vertical axis of the plane, where determining the axis of rotation comprises: determining that the position of intersection is within a section of the plurality of sections; and determining, as the axis of rotation, the horizontal or vertical axis of the plane aligned to the section.

In some embodiments, the method further comprises determining that the position of intersection corresponds to a user input associated with a level of zoom of the augmented reality object, where providing the modified version of the augmented reality object for display comprises increasing or decreasing the level of zoom of the augmented reality object during the period of time. In some embodiments, the method further comprises providing a different view of the augmented reality object for display by a different HMD worn by a different user; and modifying the different view of the augmented reality object for display by the different HMD according to the modified version of the augmented reality object.

In some embodiments, determining the gaze direction of the user using the sensor data captured by the sensor comprises: determining a head orientation using the sensor data; determining a pupil orientation using the sensor data; and determining that a difference between the head orientation and the pupil orientation is less than a threshold value. The HMD may include at least one motion sensor to capture the sensor data for determining the head orientation and at least one imaging sensor to capture the sensor data for determining the pupil orientation.

In an embodiment, a method includes providing an augmented reality graphic for display by a head-mounted device (HMD) worn by a user, the augmented reality graphic displayed on a plane and overlaid on an object presented by a display of a client device. The method further includes determining a gaze direction of the user using sensor data captured by a sensor of the HMD. The method further includes, responsive to determining that the gaze direction intersects with the augmented reality graphic on the plane and remains intersecting for at least a period of time, determining a position of intersection between the gaze direction and the augmented reality graphic on the plane; and transmitting instructions to the client device to modify the object in the display according to the position of intersection during the period of time.

In some embodiments, the method further comprises determining that the user performed a user gesture, where modifying the object in the display is based on the user gesture. In some embodiments, the user gesture is a motion of an eye or hand of the user. In some embodiments, the user gesture is a pinch motion performed using fingers of the user, and where modifying the object in the display includes modifying a level of zoom of the object in the display. In some embodiments, transmitting the instructions to the client device includes translating motion of the gaze direction of the user with respect to the plane into the instructions, the instructions compatible with a type of the client device; and transmitting the instructions to the client device over a secured network.

In some embodiments, a non-transitory computer-readable storage medium stores instructions that when executed by one or more processors cause the one or more processors to perform steps including any of the methods described herein.

DETAILED DESCRIPTION

I. Example System Environment

Figure (FIG. 1 illustrates an example system environment for a processing system 100 according to an embodiment. The system environment shown in FIG. 1 includes the processing system 100, one or more head-mounted devices (HMDs) 110, and one or more client devices 120, which may be connected to another component via a network 130, e.g., the Internet, WIFI, BLUETOOTH®, or another type of wired or wireless network. In other embodiments, different or additional entities can be included in the system environment. The functions performed by the various entities of FIG. 1 may vary in different embodiments. For instance, the processing system 100 may execute on a server or the cloud. In a different embodiment, the some or all functionality of the processing system 100 may execute on one or more of the HMDs 110 or client devices 120.

The processing system 100 provides information for display of graphics or objects by a HMD 110 or a client device 120. The processing system 100 may process sensor data or user inputs from a HMD 110 or a client device 120 to determine gaze direction of a user. Using the gaze direction, the processing system 100 may modify a displayed object, for example, by rotating the object, translating position of the object, or changing a level of zoom of the object, among other types of suitable modifications. In some embodiments, the processing system 100 determines that a user intends to manipulate a displayed object responsive to determining that the gaze direction of the user intersects with an augmented reality graphic displayed by a HMD 110 worn by the user, e.g., and remains intersecting for at least a period of time.

The HMD 110 is configured to capture sensor data used for determining gaze direction, e.g., in a localized environment. In some embodiments, the HMD 110 includes motion sensors, e.g., an accelerometer, gyroscope, or inertial measurement unit (IMU), which captures motion data. The motion data may be used by the HMD 110 (or processing system 100) to determine head position information, which is indicative of gaze direction. Additionally, the HMD 110 may include sensors that capture eye orientation information. For example, the HMD 110 uses one or more types of imaging sensors to image an eye of a user wearing the HMD 110. Image processing techniques may be performed to extract eye orientation information from images of the eye (e.g., based on specular reflection). In some embodiments, the processing system 100 determines that the user's head orientation and pupil orientation match for a gaze direction to be computed by processing system 100 because the match may more reliably indicate user intent with regard to interacting with a virtual object. In other embodiments, either the eye position and direction, or the head position and direction is used to determine user intent. The processing system 100 may also use data captured by imaging sensors inside the HMD 110 to detect facial expressions or motions of an eye such as whether the user closes or opens an eyelid, or blinks.

Additionally, the HMD 110 may include imaging sensors to capture other information. For example, the imaging sensors capture a field of view of the user while wearing the HMD 110. The processing system 100 may use image processing techniques to determine whether the user is performing gestures in the user's field of view, e.g., the user waving a hand or performing another motion of the hands or arms in front of the user's face. Since augmented reality objects are presented in the user's field of view, the user's gestures to interact with the augmented reality objects may also be within the field of view of the imaging sensors. The HMD 110 may include one or more depth sensors used to determine distances between the HMD 110 and other objects in the user's line of sight or field of view.

In some embodiments, the HMD 110 includes an electronic display. The electronic display may display graphics in an artificial reality environment. Furthermore, the electronic display may include other feedback mechanisms such as a speaker to provide audio to a user, or mechanisms for haptic feedback. In other embodiments, the HMD 110 includes a projector (instead of an electronic display) to present graphics. An example HMD 110 is the MICROSOFT® HOLOLENS™, though it should be noted that other types of head-mounted devices may be included in the system.

A client device 120 is a computing device capable of receiving user input and providing information for display to a user. In one embodiment, a client device 120 is a conventional computer system, such as a desktop or a laptop computer. Alternatively, a client device 110 may be a tablet, smartphone, mobile telephone, wearable device, or another suitable type of device. The client device 120 may include an electronic display to display an object in 2D or 3D. The client device 120 may receive user inputs from devices such as a mouse, keyboard, touchscreen, gesture, other motions of a body of a user, etc. Additionally, or alternatively, the client device 120 may receive user inputs or other information from the processing system 100 or HMD 110 for modifying a displayed object. In some embodiments, the client device 110 authorizes the processing system 100 or HMD 110 to manipulate an object displayed by the client device 110 responsive to determining that the processing system 100 or HMD 110 is registered with the client device 110.

Figure 2A:
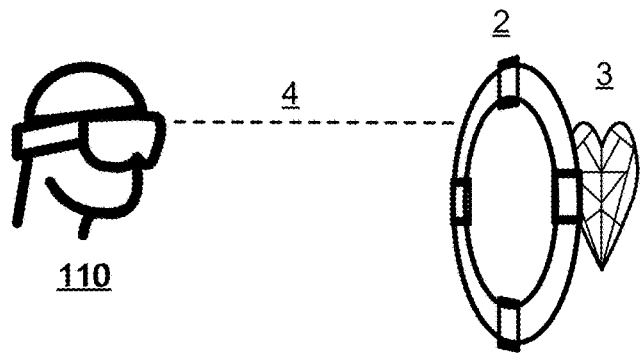
FIGS. 2A and 2B illustrate example augmented reality graphics overlaid on a display of an object according to various embodiments.
Figure 2B:
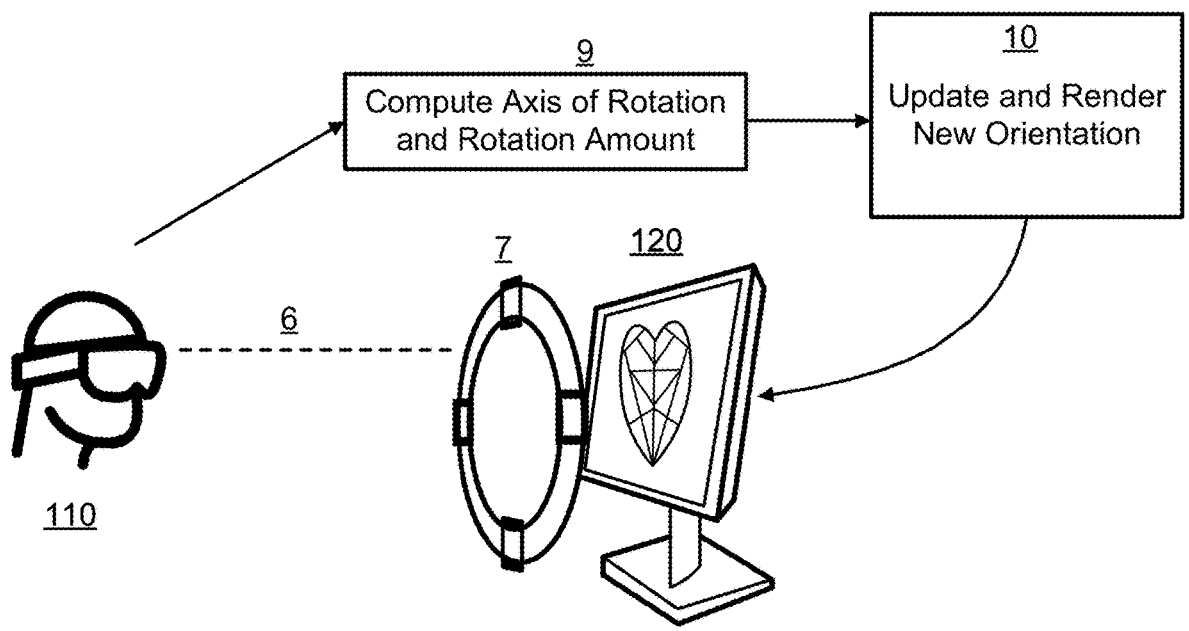

FIGS. 2A and 2B illustrate example augmented reality graphics overlaid on a display of an object according to various embodiments. In the example illustrated in FIG. 2A, the HMD 110 displays an augmented reality graphic 2 and an augmented reality object 3. For example, the augmented reality object 3 is a 3D representation of an organ (e.g., heart) of a patient and the user is a physician preparing for or performing a procedure associated with the organ. The augmented reality graphic 2 may be partially transparent or translucent such that the user can perceive the augmented reality object 3 behind the augmented reality graphic 2 from the user's point of view. The augmented reality graphic 2 may have an annulus shape and may be aligned to a (e.g., center) point of the augmented reality object 3.

In some embodiments, the processing system 100 determines a reference position for display of the augmented reality object 3. For instance, the reference position of the organ is located above a body of a patient in an operating room. The processing system 100 may determine to display the augmented reality graphic 2 on a plane between the HMD 110 and the augmented reality object 3 at the reference position. Additionally, the plane may be orthogonal or approximately orthogonal to the gaze direction 4 of the user. The augmented reality object 3 may remain centered (or "anchored") to the reference position. Thus, as the user's gaze direction changes due to head or eye movements, the processing system 100 may update the position of the augmented reality graphic 2 to track (e.g., remain orthogonal or centered to) the gaze direction, but maintain position of the augmented reality object 3 from the point of view of the user. For instance, if the user looks away from the augmented reality object 3, the HMD 110 may display the augmented reality object 3 in the peripheral vision of the user.

In the example illustrated in FIG. 2B, the HMD 110 displays an augmented reality graphic 7, and a client device 120 displays an object. For instance, the client device 120 is a computing device with a monitor. In an embodiment, the processing system 100 uses the gaze direction 6 of a user wearing the HMD 110 to compute 9 an axis of rotation and a rotation amount (e.g., degrees or radians). The processing system 100 provides this rotation information to the client device 120 to update 10 and render a new orientation of the displayed object. Accordingly, the processing system 100 may enable the user to manipulate the display of the client device 120 in a hands-free or touch-free manner, as opposed to having to touch an input device such as a mouse, keyboard, or touchscreen. In some embodiments, the processing system 100 enables the user to manipulate the display of the client device 120 in a sterile environment. For example, using hand gestures without requiring that the hands touch an input device, which would break sterility of gloves or other equipment worn or handled by the user.

The processing system 100 may determine a reference position for display of the augmented reality object 3 using at least one of a position or orientation of the client device 120. In an embodiment, the processing system 100 determines the position or orientation of the client device 120 during a registration process. For example, the processing system 100 detects that the gaze direction 6 intersects with the client device 120 or with a graphic (e.g., a user interface button) displayed on the monitor of the client device 120. As another example, imaging sensors of the HMD 110 capture an image of a graphic displayed by the client device 120. The processing system 100 may use any number of image processing or object recognition techniques to identify the presence or absence of the graphic, or information from the graphic (e.g., a QR code or barcode). Responsive to the detection, the processing system 100 registers the HMD 110 with the client device 120.

In some embodiments, the processing system 100 can determine the position or orientation of the client device 120 relative to the HMD 110 using the gaze direction 6 or other sensor data (e.g., depth information) captured by the HMD 110. In some embodiments, the processing system 100 registers the HMD 110 with the client device 120 further responsive to receiving credentials (e.g., login identification or password) from the user. The user may input the credentials via the HMD 110 or client device 120. In some embodiments, the processing system 100 determines boundaries of a monitor of a client device 120 for registration. The boundaries may be used to frame other graphics or as reference position(s).

II. Example Control Using Augmented Reality Graphic

Figure 3:
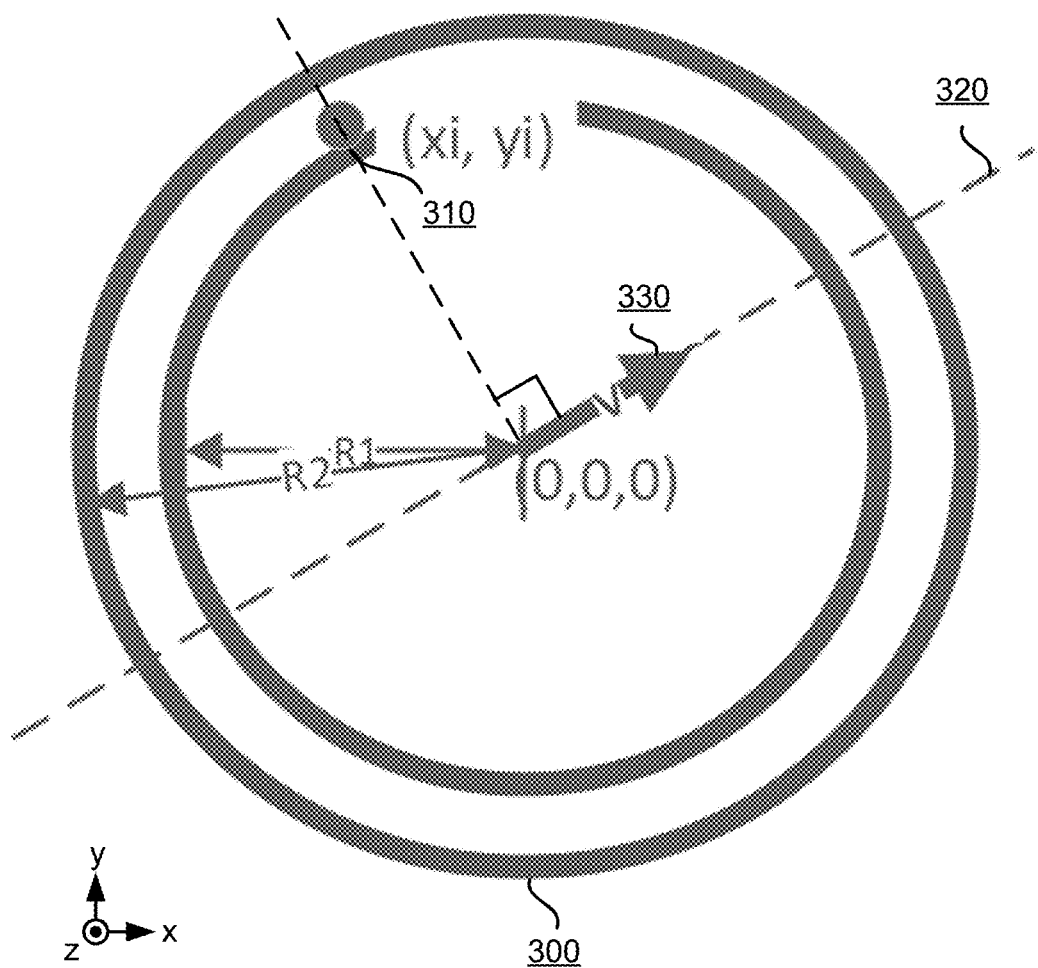
FIG. 3 illustrates an example rotation axis according to an embodiment.

FIG. 3 illustrates an example rotation axis according to an embodiment. In the example illustrated in FIG. 3, an augmented reality graphic 300 is an annulus. The annulus has a thickness defined by an inner radius R1 and an outer radius R2. In other embodiments, the augmented reality graphic 300 may have a different type of shape or attribute (e.g., color, size, etc.). A HMD 110 displays the augmented reality graphic 300 on a 2D plane, e.g., the X-Y plane at z=0 as shown in the coordinate system of FIG. 3. In some embodiments, the augmented reality graphic 300 may have a thickness (e.g., in the z-axis) and be displayed by the HMD 110 in 3D. The HMD 110 also displays a marker 310 on the same plane as the augmented reality graphic 300. The processing system 100 determines the position of the marker 310 by determining an intersection point between the plane and a gaze direction of a user wearing the HMD 110. As the user's head or eyes move, the processing system 100 may update the position of the marker 310 in real-time to track the movement. Manipulation of the marker 310 using gaze direction may be analogous to manipulation of a cursor a computer using mouse movements.

The processing system 100 can modify displays, e.g., of an augmented reality object displayed by a HMD 110, using detected user interactions with the augmented reality graphic 300. The modification may involve one or more of rotation, zoom, translation, or other types of changes, modifications, or transformations to a displayed object. In some embodiments, responsive to determining that the marker 310 (based on a user's gaze direction) intersects the augmented reality graphic 300 for at least a threshold period of time, the processing system 100 determines that the user intends to manipulate a display. The threshold period of time may be between 10-1000 milliseconds (or a different duration) and is used by the processing system 100 to filter out incidences where a user's gaze direction momentarily intersects the augmented reality graphic 300 without intent to actually manipulate the display. The processing system 100 may determine intent to manipulate the display responsive to determining that a user's eye direction is within a threshold angle θ degrees of the user's gaze direction, and as a result, the processing system 100 may determine that the threshold period of time is satisfied.

In some embodiments, responsive to determining that the marker 310 intersects the body of the annulus, the processing system 100 determines to manipulate display of an object by rotating the object about a rotation axis. The body of the annulus may include the area between the inner and outer radii R1 and R2. The shape of the annulus may provide the user with the perception that the user is rotating a virtual sphere by looking at an edge of the sphere on the plane of the annulus (e.g., a cross section of the sphere). Since the augmented reality graphic 300 may be overlaid on a displayed object, the augmented reality graphic 300 can provide intuitive control of the displayed object. The processing system 100 may continue to rotate the displayed object as long as the user's gaze direction remains intersecting the annulus. Responsive to determining that the user's gaze direction no longer intersects the annulus, the processing system 100 may stop rotation (or other modification) of the displayed object. The processing system 100 may rotate the display of the object at a predetermined speed. The speed may be constant or variable such as (e.g., gradually) increasing based on the duration of the user's (e.g., continuous) gaze. Furthermore, the processing system 100 may adjust the speed based on user control, e.g., to speed up or down.

In the embodiment shown in FIG. 3, the processing system 100 determines a rotation axis using the intersection point between the gaze direction of a user wearing an HMD 110 and the annulus. The processing system 100 determines the position of a user's head $\vec{P} = (p_x, p_y, p_z)$, which may be based on information from a registration or calibration process, e.g., to locate the user's head relative to a reference 3D coordinate system of a room. The processing system 100 uses sensor data from the HMD 110 to determine the unit vector $\vec{u} = (u_x, u_y, u_z)$ of the user's gaze direction in the same 3D coordinate system. The processing system 100 uses the unit vector and position of the user's head to calculate a vector representation of the gaze direction:

$$(x,y,z) = \vec{u} *t + \vec{P}$$

In the example of FIG. 3, the annulus is centered about (0, 0, 0) on a X-Y plane. Since z=0, and $$t = -\frac{p_z}{u_z},$$

the processing system 100 determines that values of t>=0 correspond to the user's gaze direction facing away from the plane. In other embodiments, the annulus may be centered about another coordinate point, e.g., different than the origin. The processing system 100 determines that value of t<0 correspond to the user's gaze direction facing toward the plane and thus intersecting the plane. The processing system 100 determines the intersection point of the gaze direction and the plane as:

$$(x_i, y_i) = \left(-\frac{p_z u_x}{u_z}, -\frac{p_z u_y}{u_z}\right)$$

The processing system 100 determines a vector between the intersection point of the marker 310 and the center point of the annulus. The processing system 100 determines an axis of rotation 320 in the plane of the annulus using the unit vector 330 orthogonal to the vector between the intersection point and the center point. The processing system 100 determines the unit vector $\vec{v}$ 330 using the following, where $R = \sqrt{x_i^2 + y_i^2}$:

$$\vec{v} = \frac{(y_i, -x_i, 0)}{R}$$

The processing system 100 may determine incremental rotation of α degrees about the rotation axis aligned with the unit vector $\vec{v}$ using the following matrix computation (in 3×3 matrix notation). The processing system 100 uses the incremental rotation to update display of an object, which may be displayed by the HMD 110 or by another client device 120.

$$\text{Rotation Matrix} = \vec{v}^t \vec{v} + \cos(\alpha)(I - \vec{v}^t \vec{v}) + \sin(\alpha)S$$

$$\text{where } v^t v = \begin{bmatrix} y_i^2 & -x_i y_i & 0 \\ -x_i y_i & x_i^2 & 0 \\ 0 & 0 & 0 \end{bmatrix}, I = \begin{bmatrix} 1 & 0 & 0 \\ 0 & 1 & 0 \\ 0 & 0 & 1 \end{bmatrix}, S = \begin{bmatrix} 0 & 0 & -x_i \\ 0 & 0 & -y_i \\ x_i & y_i & 0 \end{bmatrix}$$

Figure 4A:
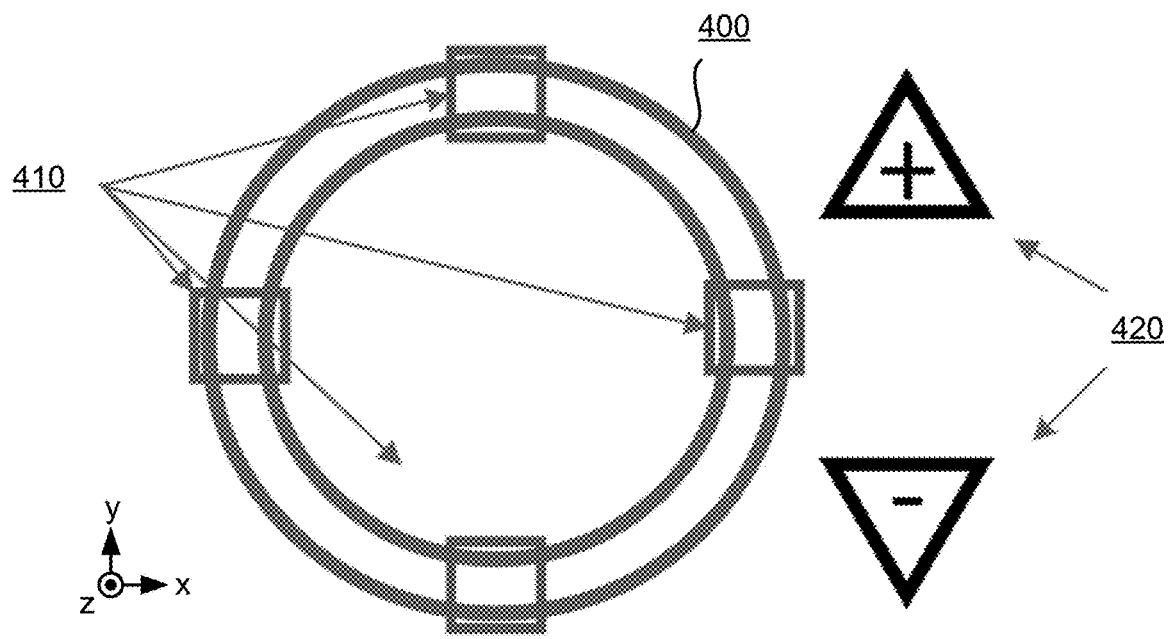
FIGS. 4A and 4B illustrate example augmented reality graphics according to various embodiments.
Figure 4B:
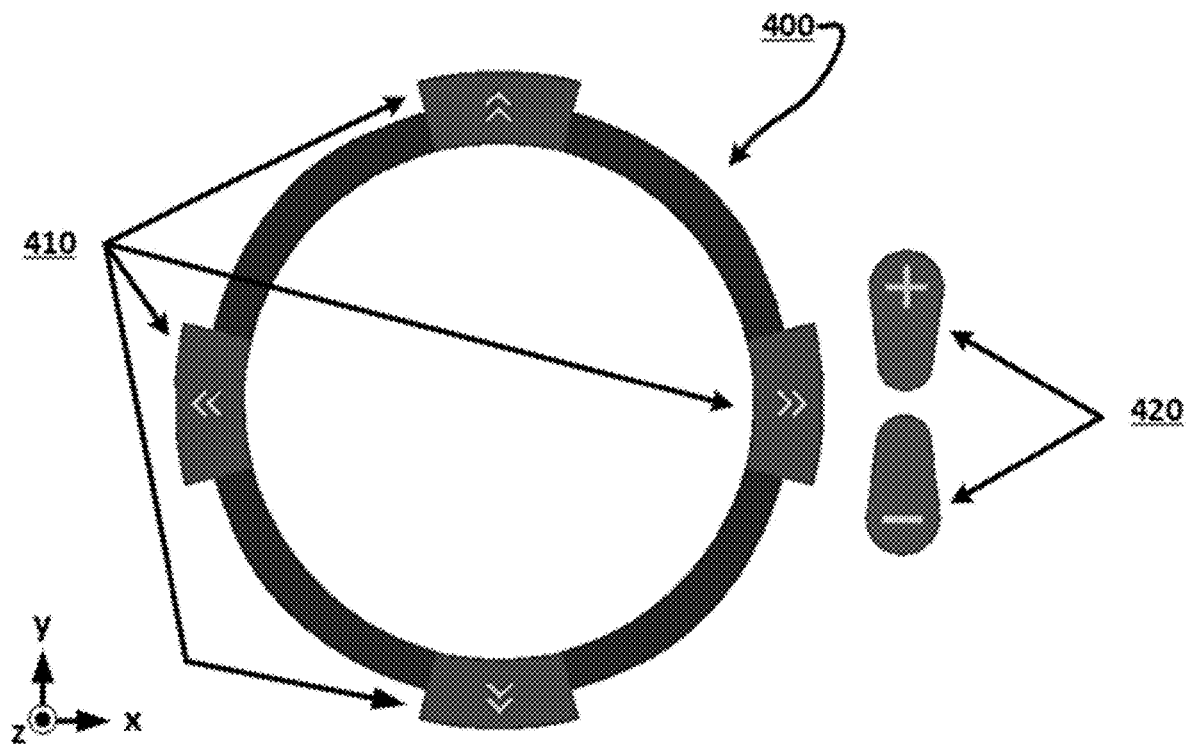

FIGS. 4A and 4B illustrate example augmented reality graphics according to various embodiments. In the embodiments shown in FIGS. 4A-B, the augmented reality graphic 400 is an annulus with four predetermined sections. The sections are aligned with the X or Y axis. The sections are rectangular in shape as illustrated in FIG. 4A, though in other embodiments, the sections may have different shapes, sizes, etc., as shown in FIG. 4B. Responsive to determining that a user's gaze direction intersects with an area of one of the sections, the processing system 100 may determine to use the X or Y axis as the rotation axis instead of using the unit vector $\vec{v}$ in the above described process. For instance, the left and right sections correspond to rotation about the Y axis in the left and right directions, respectively, from the perspective of the user. Additionally, the upper and lower sections correspond to rotation about the X axis in the up and down directions, respectively, from the perspective of the user. The sections may provide coarse control of the rotation axis while portions of the annulus outside of the sections may provide fine control of the rotation axis. A user can switch between coarse control and fine control to accommodate a particular task.

The embodiments of FIGS. 4A-B also include additional augmented reality graphics 420, which may be used to modify other attributes of a displayed object. For instance, responsive to determining that the user's gaze direction intersects the "+" graphic, the processing system 100 increases a level of zoom of a displayed object. In addition, responsive to determining that the user's gaze direction intersects the "−" graphic, the processing system 100 decreases a level of zoom of a displayed object. In some embodiments, the processing system 100 may modify attributes of the displayed object based on other detected actions of the user. For instance, responsive to determining that the user is performing a pinch motion (e.g., moving two or more fingers closer to or further from each other), the processing system 100 modifies the level of zoom of the displayed object.

III. Example Process Flows

Figure 5:
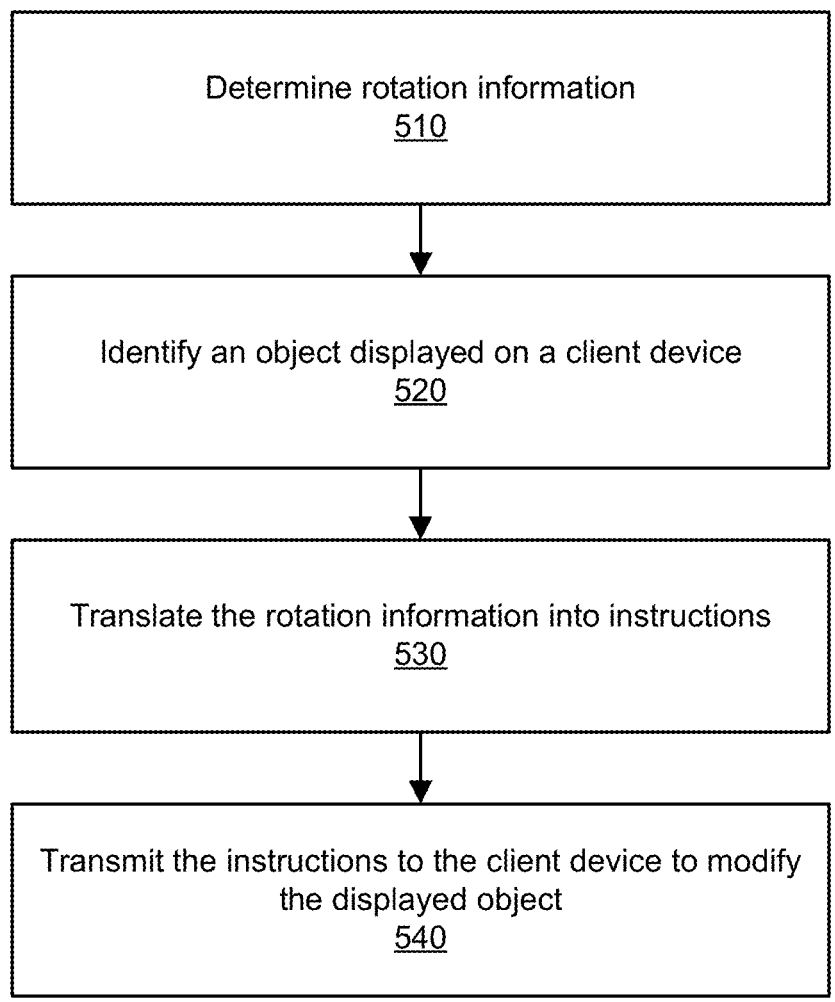
FIG. 5 is a flowchart of a process for rotation control using mouse emulation according to an embodiment.

FIG. 5 is a flowchart of a process 500 for rotation control using mouse emulation according to an embodiment. The processing system 100 may use the process 500 to provide a user wearing an HMD 110 with control of displays of client devices 120, without necessarily having to use a separate input device such as a mouse or keyboard. The processing system 100 determines 510 rotation information, e.g., an axis of rotation and rotation amount, using the processes described above with respect to FIG. 3. The processing system 100 identifies 520 an object displayed on a client device 120, which may have been registered with the HMD 110. The processing system 100 translates 530 the rotation information into instructions compatible with the client device 120. For example, the client device 120 is computer that can receive user input via wireless universal serial bus (USB) mouse. Accordingly, the instructions may be mouse primitives such as (X, Y) coordinate position on a 2D plane, button presses, scroll wheel movement, or mouse motions, etc. The processing system 100 may use one or more different algorithms to translate 530 the rotation information depending on the type of input device interfacing with the client device 120. For instance, a keyboard includes different controls than a mouse.

The processing system 100 transmits 540 the instructions to the client device 120 to modify the displayed object. In above example with the wireless mouse, the client device 120 may be coupled via USB to a wireless receiver (or transceiver). The processing system 100 may transmit the instructions to the wireless receiver, e.g., over BLUETOOTH®. In some embodiments, the processing system 100 transmits the instructions over other types of network connections, e.g., virtual private network (VPN) for secure or encrypted communication, to the client device 120. The client device 120 may have software such as MICROSOFT® Remote Desktop to process the received instructions for modifying the displayed object.

In some embodiments, the processing system 100 manipulates a displayed object using a user's gaze direction and another gesture performed by the user. Following in the example of mouse emulated control of a computer displayed user interface, the processing system 100 may associate a certain gesture (e.g., a blink, head nod, or hand motion) with a mouse click. When using a mouse, to select an item shown on a display, a user may navigate a mouse cursor to the item and then click a mouse button. In an embodiment, a user wearing a HMD 110 may navigate a marker (e.g., marker 300 shown in FIG. 3) to an item and then perform a certain gesture for selection of the item. In contrast to the mouse scenario, the HMD 110 scenario may be hands-free or touch-free.

FIG. 6 is a flowchart of a process 600 for modifying a display in an augmented reality environment according to an embodiment. FIGS. 7A, 7B, and 7C illustrate a sequence of example fields of view of a user in an augmented reality environment according to an embodiment. An example use case of the process 600 of FIG. 6 is described below with reference to FIGS. 7A-C.

The processing system 100 provides 610 an augmented reality object 730 for display by a HMD 110 worn by a user. In the example shown in FIG. 7A, the augmented reality object 730 is a cube. The processing system 100 provides 620 an augmented reality (AR) graphic 740 (e.g., having an annulus shape) for display by the HMD 110 on a plane and overlaid on (e.g., encircling) the augmented reality object 730. Also shown in FIG. 7A is a marker 720 indicating an intersection point between the user's gaze direction 710 and the plane. The augmented reality object 730 and augmented reality graphic 740 are shown in FIG. 7A from the perspective of the user. In FIG. 7A, the user is looking toward the right based on the gaze direction 710, so the marker 720 is toward the right side of the augmented reality graphic 740.

The processing system 100 determines 630 a gaze direction 750 of the user using sensor data captured by a sensor of the HMD 110. Between the user's position in FIG. 7A to FIG. 7B, the user has moved the user's gaze direction from the right side to the left side. Thus, the processing system 100 determines gaze direction 750 of FIG. 7B that is different from the gaze direction 710 of FIG. 7A. In addition, the processing system 100 updates the position of the marker 720 to the left side of the augmented reality graphic 740.

The processing system 100 determines 640 that the gaze direction 750 intersects with the augmented reality graphic 740 on the plane and remains intersecting for at least a period of time. As shown in FIG. 7B, the marker 720 intersects with the body of the annulus of the augmented reality graphic 740. The processing system 100 may also determine that the gaze direction 750 intersects with a certain section of the augmented reality graphic 740, e.g., corresponding to coarse control for rotation about the Y-axis toward the left.

Responsive to the determination 640, the processing system 100 determines 650 a position of intersection between the gaze direction 750 and the augmented reality graphic 740 on the plane. The position of intersection is indicated by (e.g., a center point of) the marker 720. Also in response to the determination 640, the processing system 100 provides 660 a modified version of the augmented reality object 730 for display by the HMD 110 according to the position of intersection during the period of time. As shown in FIG. 7B, the processing system 100 modifies the displayed augmented reality object 730 by rotating the augmented reality object 730 toward the left, from the perspective of the user. Particularly, from FIG. 7A to 7B, the shaded side of the cube has moved to face the user. The processing system 100 may continue to rotate the augmented reality object 730 responsive to determining that the user's gaze direction 750 continues to intersect the augmented reality graphic 740. As shown in the example of FIG. 7C, the user's gaze direction remains the same as shown in FIG. 7B. Thus, the processing system 100 continues to rotate the augmented reality object 730 about the Y-axis toward the left.

In some embodiments, the process 600 includes determining an axis of rotation using the position of intersection. For instance, as shown in FIG. 3, the processing system 100 may determine a vector on the plane of the augmented reality graphic 740 between the center of the annulus and the position of intersection. The processing system 100 determines an axis orthogonal to the vector on the plane as the axis of rotation. The augmented reality graphic 740 may have sections that are aligned to a horizontal or vertical axis of the plane, e.g., the X and Y axis, respectively, as shown in FIGS. 7A-C. The processing system 100 may determine to use the horizontal or vertical axis as the axis of rotation responsive to determining that the position of intersection is within one of the sections, e.g., using the Y-axis as shown in FIGS. 7B-C.

In embodiments with multiple HMDs 110, the processing system 100 may coordinate displays across the multiple HMDs 110. For example, the processing system 100 provides a view of an augmented reality object to a first user wearing a first HMD 110. The processing system 100 can provide a different view of the same augmented reality object to a second user wearing a second HMD 110. The second user is at a different location than the first user. For instance, the two users are on different sides of a room looking toward the augmented reality object, which is displayed in the center of the room. Using the distances or orientations of the HMDs 110 relative to the displayed augmented reality object in the room, the processing system 100 can determine the different views for the two users. Furthermore, the processing system 100 may provide an augmented reality graphic to any number of the users to manipulate the augmented reality object. Responsive to determining that one of the users manipulated the augmented reality object, the processing system 100 may modify the displayed view of the same augmented reality object perceived by one or more other users in the system. In other embodiments, the processing system 100 may synchronize displays of multiple HMDs 110 such that each of the HMDs 110 provide the same view of an object as perceived by the users, independent of the positions of the users relative to each other.

The examples of FIGS. 7A-C show a cube as the augmented reality object 730 for purposes of illustration. However, in other embodiments, the processing system 100 may provide objects for display having other types of shapes or attributes. In various embodiments, the displayed objects represent physiology of an organism, which is further described below.

IV. Example User Interface Displays

FIGS. 8A, 8B, 8C, and 8D illustrate example augmented reality graphics according to an embodiment. A HMD 110 or another type of display may show an object including 3D features such as curvatures, gradients, channels, or cavities inside an organ, as shown in FIGS. 8A-D. The processing system 100 may be used by one or more physicians for an interventional procedure on a person or animal. For example, while conducting surgery (or another type of operation) on a heart of patient, the processing system 100 may provide an augmented reality object representing the heart. The embodiments described above can provide hands-free or touch-free control of the augmented reality object to assist the physician in conducting the surgery. For instance, the physician may want to rotate or adjust the level of zoom of the visualization of the heart to help navigate instruments to a target site or chamber of the heart.

In the examples shown in FIGS. 8A-D, the processing system 100 may provide graphics representing one or more instruments (e.g., catheters) as well as position and/or orientation of the instruments relative to and/or inside an organ on which a physician is operating or observing. Additionally, the processing system 100 may provide other graphics such as markers on an operating site (e.g., circular or spherical shapes shown in FIGS. 8A-D) to assist physicians in performing or monitoring a procedure. Hands-free or touch-free control may be advantageous because the physician's hands are occupied by controls of the instruments and touching a display or input device (e.g., a mouse or keyboard) would break sterility.

Figure 8A:
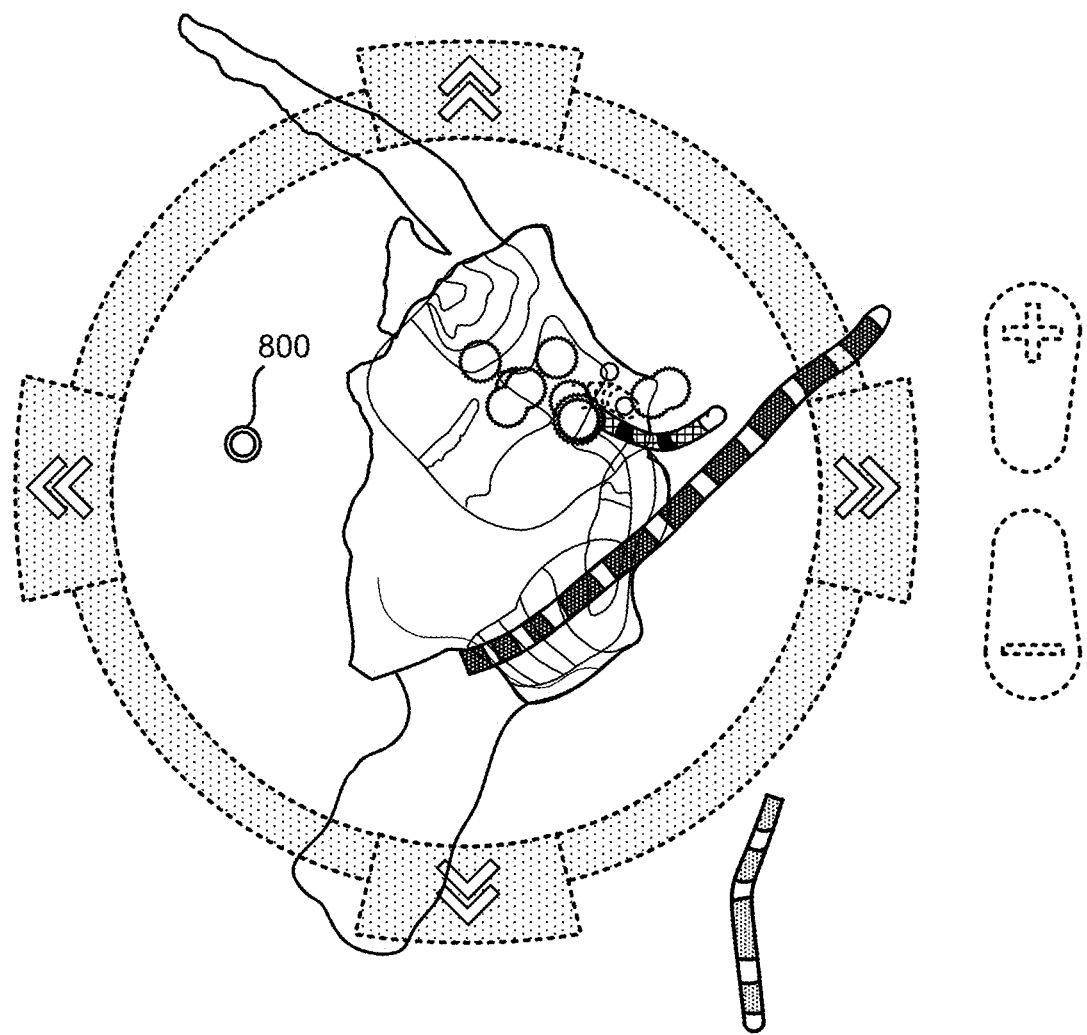
FIGS. 8A, 8B, 8C, and 8D illustrate example augmented reality graphics according to an embodiment.
Figure 8B:
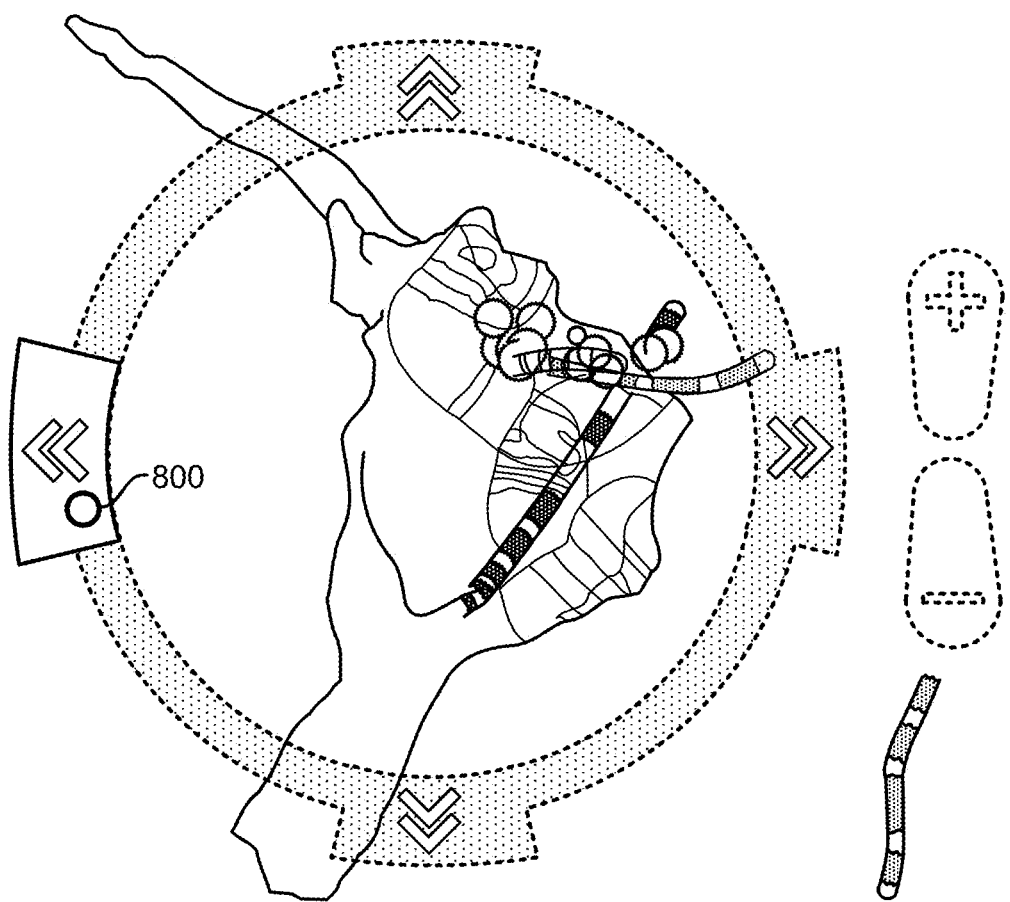
Figure 8C:
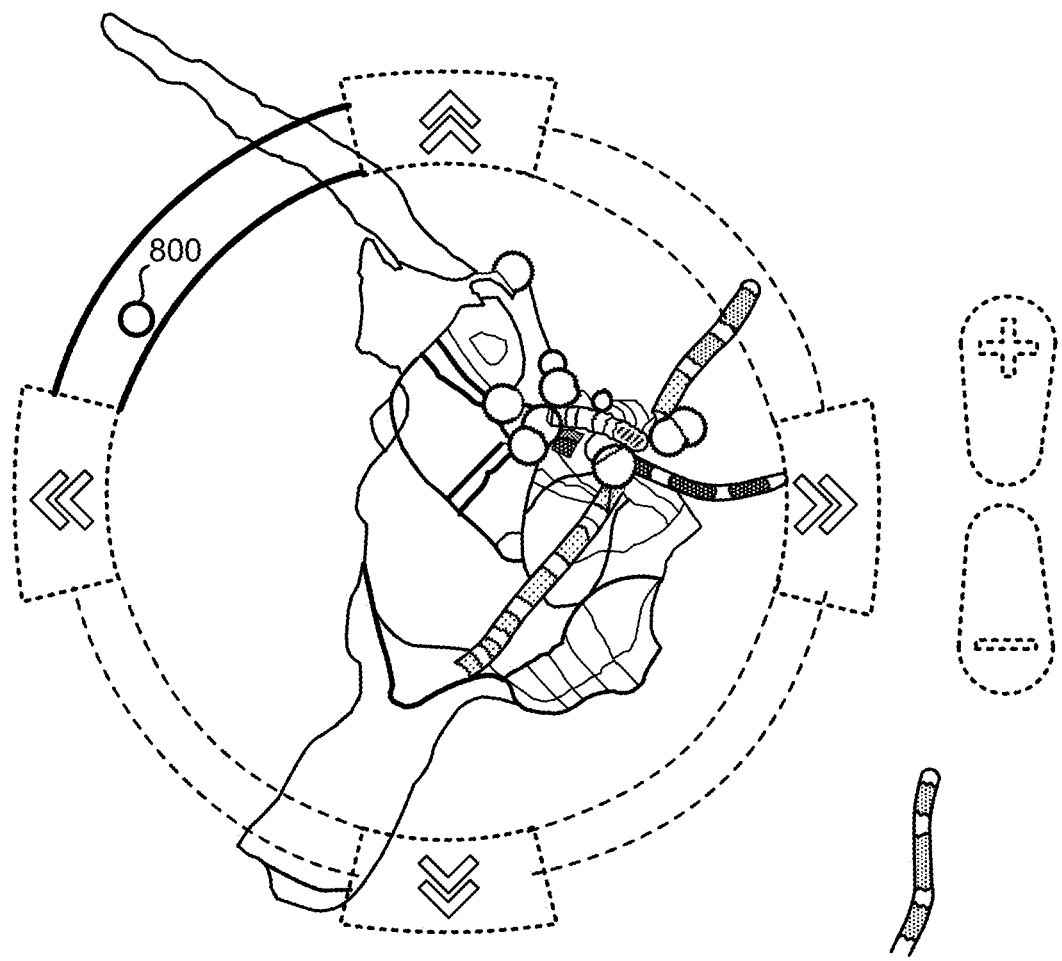
Figure 8D:
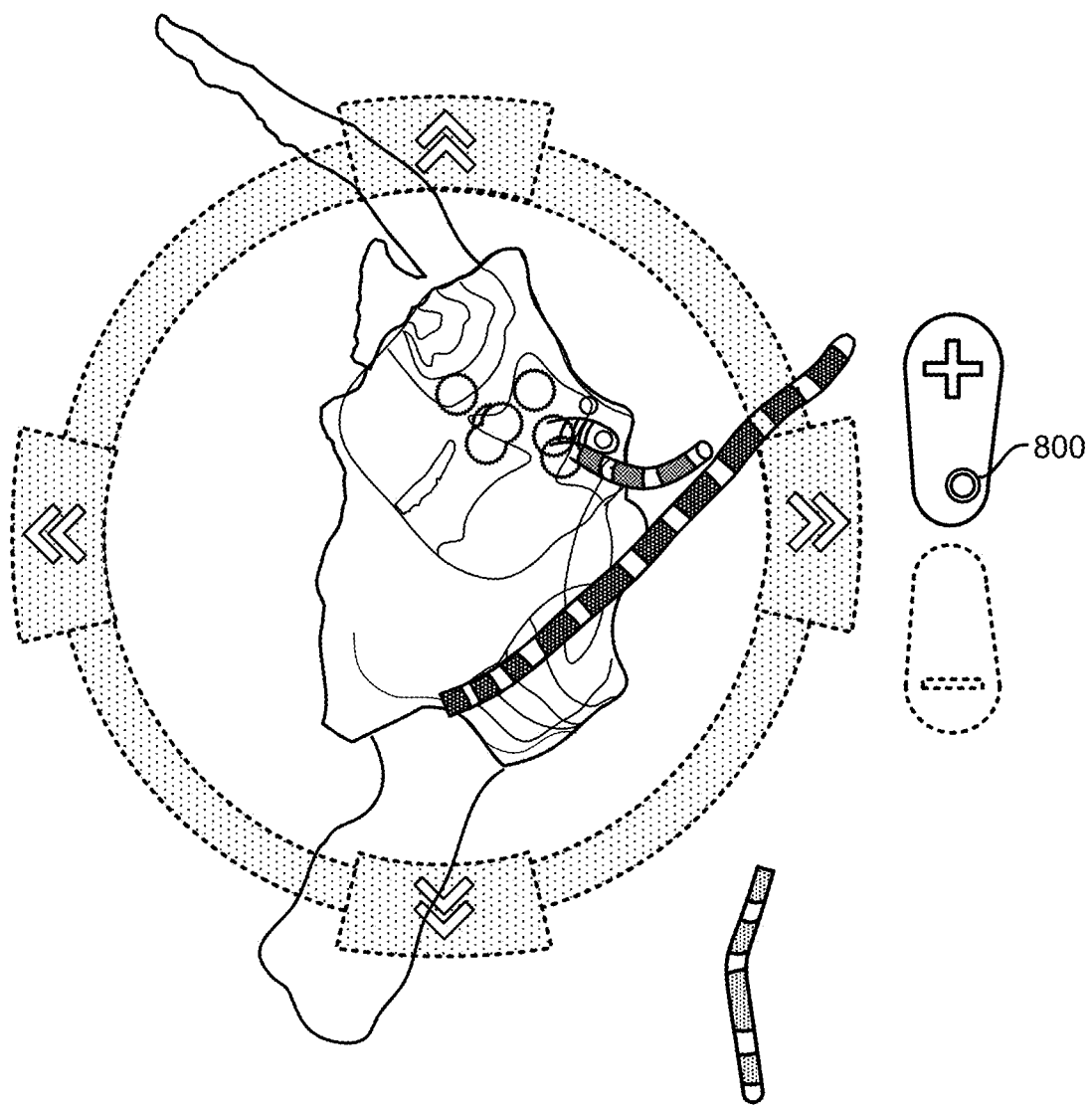

In the embodiment of FIGS. 8A-D, the processing system 100 may track the gaze direction of a user as indicated by the circular shape 800. As shown in FIG. 8B, the processing system 100 may rotate the displayed object about an axis responsive to determining that the gaze direction intersects with a section (e.g., the "<<" symbol) of the annular augmented reality graphic. As shown in FIG. 8C, the processing system 100 may rotate the displayed object about a different axis responsive to determining that the gaze direction intersects with a different section of the annular augmented reality graphic. As shown in FIG. 8D, the processing system 100 may modify a level of zoom of the displayed object responsive to determining that the gaze direction intersects with a user input (e.g., the "+" symbol).

V. Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
    a head-mounted device (HMD) worn by a user, the HMD including a sensor, and
    a non-transitory computer-readable storage medium storing instructions, the instructions when executed by one or more processors cause the one or more processors to:
        provide an augmented reality object for display by the HMD, wherein the augmented reality object displays a part of a patient for a medical procedure;
        provide an augmented reality graphic for display by the HMD on a plane between the augmented reality object and the HMD from a perspective of the user wearing the HMD, wherein the augmented reality graphic is displayed as overlaid on the augmented reality object, wherein the augmented reality graphic includes a plurality of sections to control a level of zoom or rotation of display of the augmented reality object, and wherein the augmented reality graphic surrounds at least a part of the augment reality object and has a center aligned to the augmented reality object;
        determine a gaze direction of the user using sensor data captured by the sensor; and
        responsive to determining that the gaze direction intersects with a section of the plurality of sections of the augmented reality graphic at an intersection point on the plane and remains intersecting for at least a period of time:
            modify the level of zoom or rotation of the augmented reality object for display by the HMD according to the section during the period of time.

2. The system of claim 1, wherein the non-transitory computer-readable storage medium stores further instructions that when executed by the one or more processors cause the one or more processors to:
    determine an axis of rotation using the intersection point; and
    wherein providing the modified version of the augmented reality object for display comprises rotating the augmented reality object about the axis of rotation during the period of time.

3. The system of claim 2, wherein the augmented reality graphic has an annulus shape, and wherein determine the axis of rotation comprises:
    determine a vector on the plane between the center and the intersection point; and
    determine, as the axis of rotation, an axis orthogonal to the vector on the plane.

4. The system of claim 2, wherein the plurality of sections are aligned to a horizontal or vertical axis of the plane, and wherein determine the axis of rotation comprises:
    determine, as the axis of rotation, the horizontal or vertical axis of the plane aligned to the section.

5. The system of claim 1, wherein the non-transitory computer-readable storage medium stores further instructions that when executed by the one or more processors cause the one or more processors to:
    provide a different view of the augmented reality object for display by a different HMD worn by a different user; and
    modify the different view of the augmented reality object for display by the different HMD according to the modified version of the augmented reality object.

6. The system of claim 1, wherein determine the gaze direction of the user using the sensor data captured by the sensor comprises:
    determine a head orientation using the sensor data;
    determine a pupil orientation using the sensor data; and
    determine that a difference between the head orientation and the pupil orientation is less than a threshold value.

7. A method comprising:
    providing an augmented reality object for display by a head-mounted device (HMD) worn by a user, wherein the augmented reality object displays a part of a patient for a medical procedure;
    providing an augmented reality graphic for display by the HMD on a plane between the augmented reality object and the HMD from a perspective of the user wearing the HMD, wherein the augmented reality graphic is displayed as overlaid on the augmented reality object, wherein the augmented reality graphic includes a plurality of sections to control a level of zoom or rotation of display of the augmented reality object, and wherein the augmented reality graphic surrounds at least a part of the augment reality object and has a center aligned to the augmented reality object;
    determining a gaze direction of the user using sensor data captured by a sensor of the HMD; and
    responsive to determining that the gaze direction intersects with a section of the plurality of sections of the augmented reality graphic at an intersection point on the plane and remains intersecting for at least a period of time:
        modifying the level of zoom or rotation of the augmented reality object for display by the HMD according to the section during the period of time.

8. The method of claim 7, further comprising:
    determining an axis of rotation using the intersection point; and
    wherein providing the modified version of the augmented reality object for display comprises rotating the augmented reality object about the axis of rotation during the period of time.

9. The method of claim 8, wherein the augmented reality graphic has an annulus shape, and wherein determining the axis of rotation comprises:
    determining a vector on the plane between the center and the intersection point; and
    determining, as the axis of rotation, an axis orthogonal to the vector on the plane.

10. The method of claim 8, wherein the plurality of sections are aligned to a horizontal or vertical axis of the plane, and wherein determining the axis of rotation comprises:
 determining, as the axis of rotation, the horizontal or vertical axis of the plane aligned to the section.

11. The method of claim 7, further comprising:
 providing a different view of the augmented reality object for display by a different HMD worn by a different user; and
 modifying the different view of the augmented reality object for display by the different HMD according to the modified version of the augmented reality object.

12. The method of claim 7, wherein determining the gaze direction of the user using the sensor data captured by the sensor comprises:
 determining a head orientation using the sensor data;
 determining a pupil orientation using the sensor data; and
 determining that a difference between the head orientation and the pupil orientation is less than a threshold value.

13. The method of claim 7, wherein at least a portion of the augmented reality graphic is displayed as non-overlapping the augmented reality object from the perspective of the user.

14. A method comprising:
 providing an augmented reality graphic for display by a head-mounted device (HMD) worn by a user, the augmented reality graphic displayed on a plane between an object presented by a display of a client device and the HMD from a perspective of the user wearing the HMD, wherein the object displays a part of a patient for a medical procedure, wherein the augmented reality graphic is displayed as overlaid on the object presented by the display of the client device, wherein the augmented reality graphic includes a plurality of sections to control a level of zoom or rotation of display of the object, and wherein the augmented reality graphic surrounds at least a part of the augment reality object and has a center aligned to the augmented reality object;
 determining a gaze direction of the user using sensor data captured by a sensor of the HMD; and
 responsive to determining that the gaze direction intersects with a section of the plurality of sections of the augmented reality graphic at an intersection point on the plane and remains intersecting for at least a period of time:
  transmitting instructions to the client device to modify the level of zoom or rotation of the object in the display according to the section during the period of time.

15. The method of claim 14, further comprising:
 determining that the user performed a user gesture, wherein modifying the object in the display is based on the user gesture.

16. The method of claim 15, wherein the user gesture is a motion of an eye or hand of the user.

17. The method of claim 15, wherein the user gesture is a pinch motion performed using fingers of the user.

18. The method of claim 14, wherein transmitting the instructions to the client device comprises:
 translating motion of the gaze direction of the user with respect to the plane into the instructions, the instructions compatible with a type of the client device; and
 transmitting the instructions to the client device over a secured network.

19. The method of claim 14, wherein determining the gaze direction of the user using the sensor data captured by the sensor comprises:
 determining a head orientation using the sensor data;
 determining a pupil orientation using the sensor data; and
 determining that a difference between the head orientation and the pupil orientation is less than a threshold value.

* * * * *

UNITED STATES PATENT AND TRADEMARK OFFICE
CERTIFICATE OF CORRECTION

PATENT NO. : 11,199,898 B2
APPLICATION NO. : 16/453027
DATED : December 14, 2021
INVENTOR(S) : Blume et al.

Page 1 of 1

It is certified that error appears in the above-identified patent and that said Letters Patent is hereby corrected as shown below:

On the Title Page

Item (56), in Column 2, under "U.S. Patent Documents", Line 5, delete "Gene" and insert -- Genc --, therefor.

Item (56), in Column 2, under "Other Publications", Line 1, delete "Gase" and insert -- Gaze --, therefor.

Signed and Sealed this
Twenty-second Day of August, 2023

Katherine Kelly Vidal
*Director of the United States Patent and Trademark Office*